US007136555B2

(12) United States Patent
Theuerkorn et al.

(10) Patent No.: US 7,136,555 B2
(45) Date of Patent: Nov. 14, 2006

(54) DISTRIBUTION CABLE HAVING ARTICULATED OPTICAL CONNECTION NODES

(75) Inventors: Thomas Theuerkorn, Hickory, NC (US); James P. Luther, Hickory, NC (US); Martin E. Norris, Lenoir, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 10/855,179

(22) Filed: May 27, 2004

(65) Prior Publication Data

US 2005/0265672 A1   Dec. 1, 2005

(51) Int. Cl.
  *G02B 6/44*  (2006.01)
  *G02B 6/00*  (2006.01)
(52) U.S. Cl. ........................ 385/100; 385/134
(58) Field of Classification Search ............ 385/100, 385/134–139
  See application file for complete search history.

(56) References Cited

U.S. PATENT DOCUMENTS

| 4,961,623 | A |   | 10/1990 | Midkiff et al. ............. 350/96.2 |
| 5,004,315 | A |   | 4/1991  | Miyazaki ................. 350/96.15 |
| 5,042,901 | A |   | 8/1991  | Merriken et al. ........... 385/135 |
| 5,121,458 | A |   | 6/1992  | Nilsson et al. ............. 385/100 |
| 5,125,060 | A |   | 6/1992  | Edmundson ................ 385/100 |
| 5,210,812 | A |   | 5/1993  | Nilsson et al. ............. 385/100 |
| 5,440,665 | A |   | 8/1995  | Ray et al. .................. 385/135 |
| 5,528,718 | A |   | 6/1996  | Ray et al. .................. 385/136 |
| 5,708,742 | A | * | 1/1998  | Beun et al. .................. 385/53 |
| 5,790,741 | A |   | 8/1998  | Vincent et al. ............. 385/135 |
| 6,167,183 | A | * | 12/2000 | Swain ....................... 385/135 |
| 6,429,373 | B1 | * | 8/2002 | Scrimpshire et al. ..... 174/74 R |
| 6,466,725 | B1 |   | 10/2002 | Battey et al. ............... 385/135 |
| 6,493,500 | B1 | * | 12/2002 | Oh et al. .................... 385/135 |
| 6,619,697 | B1 | * | 9/2003 | Griffioen et al. ......... 285/126.1 |
| 6,741,783 | B1 | * | 5/2004 | Shibutani et al. .......... 385/134 |
| 6,840,681 | B1 | * | 1/2005 | Shibutani et al. ............. 385/53 |
| 2002/0064361 | A1 |   | 5/2002 | Battey et al. |
| 2003/0080555 | A1 |   | 5/2003 | Griffioen et al. |

FOREIGN PATENT DOCUMENTS

| DE | 3537684    | 4/1987 |
| JP | 58-105114  | 6/1983 |
| JP | 60-169813  | 9/1985 |
| JP | 60-169815  | 9/1985 |
| JP | 61-27510   | 2/1986 |
| JP | 61-190305  | 8/1986 |
| JP | 61-220536  | 9/1986 |

(Continued)

*Primary Examiner*—Sung Pak
*Assistant Examiner*—Tina M. Wong
(74) *Attorney, Agent, or Firm*—Jeffrey S. Bernard

(57) ABSTRACT

A fiber optic distribution cable having at least one mid-span access location includes a plurality of optical connection nodes for providing access to preterminated optical fibers of the distribution cable. Preferably, the optical connection nodes are articulated and linked together to form a low-profile linear chain of connection nodes that is sufficiently flexible to be deployed through small diameter conduit and aerial lashing equipment. Each connection node includes a housing that surrounds the distribution cable, a connecting link for receiving and routing one or more of the preterminated optical fibers, and an adapter for interconnecting a preterminated and connectorized optical fiber of the distribution cable with a connectorized optical fiber of a branch cable or drop cable. The distribution cable may also include a tether attached to the distribution cable such that the linear chain of connection nodes is slidably or removably attached to the distribution cable.

24 Claims, 8 Drawing Sheets

FOREIGN PATENT DOCUMENTS

| | | |
|---|---|---|
| JP | 62-054204 | 3/1987 |
| JP | 62-59906 | 3/1987 |
| JP | 63-136007 | 6/1988 |
| JP | 63-180915 | 7/1988 |
| JP | 63-287916 | 11/1988 |
| JP | 63-310317 | 12/1988 |
| JP | 1-138828 | 5/1989 |
| JP | 2001116968 | 4/2001 |

* cited by examiner

DISTRIBUTION CABLE HAVING ARTICULATED OPTICAL CONNECTION NODES

BACKGROUND OF THE INVENTION

1. Field of the Invention

The present invention relates generally to a distribution cable for a fiber optic communications network, and more specifically, to a fiber optic distribution cable having one or more articulated optical connection nodes positioned along the length of the cable for providing access to at least one preterminated optical fiber.

2. Description of the Related Art

Optical fiber is increasingly being used for a variety of broadband communications including voice, video and data transmissions. As a result of the increasing demand for broadband communications, fiber optic networks typically include a large number of mid-span access locations at which one or more optical fibers are terminated from a distribution cable. These mid-span access locations provide a branch point from the distribution cable leading to another distribution point, or a drop point from the distribution cable leading to an end user, commonly referred to as a subscriber, thereby extending an "all optical" communications network closer to the subscriber. In this regard, fiber optic networks are being developed that deliver "fiber-to-the-curb" (FTTC), "fiber-to-the-business" (FTTB), "fiber-to-the-home" (FTTH), or "fiber-to-the-premises" (FTTP), referred to generically as "FTTx." Based on the large number of mid-span access locations and the unique demands of optical fibers and optical connections, a distribution cable is needed for routing and protecting optical fibers, and for providing access to terminated optical fibers at numerous mid-span access locations in an FTTx network. A distribution cable is also needed for permitting optical fibers that are accessed and terminated from the distribution cable at mid-span access locations along the length of the distribution cable to be optically connected with optical fibers of one or more fiber optic branch cables or fiber optic drop cables.

In one example of a fiber optic communications network, one or more drop cables are interconnected with a distribution cable at a mid-span access location. Substantial expertise and experience are required to configure the optical connections in the field. In particular, it is often difficult to identify a particular optical fiber of the distribution cable to be optically connected with an optical fiber of a drop cable. Once identified, the optical fiber of the distribution cable is typically joined directly to the optical fiber of the drop cable at the mid-span access location using conventional splicing techniques, such as fusion splicing. In other instances, the optical fiber of the distribution cable and the optical fiber of the drop cable are first spliced to a short length of optical fiber having an optical connector mounted on the other end, which is generally referred to in the art as a "pigtail." The pigtails are then routed to opposite sides of a connector adapter sleeve to interconnect the drop cable with the distribution cable. In either case, the process of configuring the mid-span access location is not only time consuming, but frequently must be accomplished by a highly skilled field technician at significant cost and under field working conditions that are less than ideal. In situations in which a mid-span access location is enclosed within a conventional splice closure, reconfiguring optical connections within the splice closure is especially difficult, based in part on the relatively inaccessible location of the closure, the limited workspace available within the closure, and the inability to readily remove the closure from the distribution cable. Further, once the spliced optical connections are made, it is labor intensive, and therefore relatively costly, to reconfigure the optical connections or to add additional spliced optical connections.

In order to reduce installation costs by permitting less experienced and less skilled technicians to make optical connections and to reconfigure optical connections at mid-span access locations in the field, communications service providers are increasingly pre-engineering new fiber optic networks and demanding factory-prepared interconnection solutions, commonly referred to as "plug-and-play" type systems. Among the currently developed plug-and-play systems, most rely on a single, rigid enclosure to house multiple optical connectors, and most require extensive field labor to configure the optical connections within the enclosure during deployment of the distribution cable or during installation of fiber optic branch cables or fiber optic drop cables. Specifically, the existing plug-and-play type systems often require that a larger diameter enclosure be added to the distribution cable after the cable is deployed through a conduit having a relatively small inner diameter. In some cases, preterminated optical fibers branched from the distribution cable are routed to respective optical connectors located within an exterior wall of a factory-prepared enclosure provided on the distribution cable. However, distribution cables provided with factory-prepared enclosures tend to be large in size and not flexible enough for common deployment methods, such as being deployed through a conduit having a relatively small inner diameter or significant bends, or being deployed using conventional aerial lashing equipment, such as sheaves and rollers. In addition, current solutions are restricted in connection node count due to the same diameter constraints, thereby making such solutions incapable of accommodating larger numbers of preterminated optical fibers (e.g., 8, 10, 12) without customization or without extensive reconstruction following deployment.

In addition, in order to terminate one or more optical fibers at a mid-span access location, distribution cables having multiple buffer tubes with each comprising a plurality of optical fibers require that a particular buffer tube be accessed and the appropriate optical fibers be located, severed and extracted. In one example, the distribution cable may be an ALTOS® dielectric fiber optic cable available from Corning Cable Systems LLC of Hickory, N.C. The ALTOS® dielectric cable is a lightweight cable designed for both buried conduit and aerial deployment. By terminating the one or more optical fibers and transitioning them out of the distribution cable, any bending strain that the cable is subjected to will cause a length differential between the distribution cable and the terminated optical fibers. In a worst-case, the terminated optical fibers may fail under an excessive tension load. In addition to tension on the optical fibers, tension may be placed on the distribution cable and enclosures when the cable assembly is back-pulled through a conduit, sheaves or rollers. Furthermore, cable assemblies that utilize fan-out tubes routed to one side of the distribution cable may snag and eventually break under excessive pulling forces.

Accordingly, there is a specific and unresolved need for a factory-prepared fiber optic distribution cable including at least one mid-span access location for providing access to one or more preterminated optical fibers that has a small enough diameter and is flexible enough to be deployed through a conduit having a relatively small inner diameter or significant bends, or to be deployed using conventional aerial lashing equipment. In addition, there is a specific and unresolved need for a factory-prepared fiber optic distribution cable including one or more optical connection nodes that does not require a highly skilled field technician or extensive field labor to configure the connection nodes after deployment of the distribution cable. There is also a specific and unresolved need for a factory-prepared fiber optic distribution cable including one or more rugged, low profile optical connection nodes capable of withstanding excessive tension forces experienced during deployment of the distribution cable. It is also desirable in an FTTx fiber optic network to provide a fiber optic distribution cable including any desired number of optical connection nodes at a mid-span access location for permitting a less experienced and less skilled field technician to readily connect an optical fiber of the distribution cable to an optical fiber of a branch cable or a drop cable.

BRIEF SUMMARY OF THE INVENTION

To achieve the foregoing and other objects, and in accordance with the purposes of the invention as embodied and broadly described herein, the present invention provides various embodiments of a fiber optic distribution cable having one or more articulated optical connection nodes for providing access to at least one preterminated optical fiber. The distribution cable may be configured for any number of optical connection nodes and may be wound upon a cable reel and deployed through a conduit having an inner diameter less than about 1.9 inches, and more preferably, less than about 1.5 inches, or may be deployed using conventional aerial lashing equipment. Such a distribution cable permits a less experienced and less skilled field technician to readily connect a fiber optic branch cable or fiber optic drop cable to an optical connection node after the distribution cable is deployed by simply removing a protective dust cap and optically connecting a plug provided on the end of the branch cable or drop cable to a mating receptacle provided within the optical connection node.

In an exemplary embodiment, the present invention provides a factory prepared fiber optic distribution cable including one or more articulated optical connection nodes positioned at predetermined mid-span access locations along the length of the distribution cable. At least one optical fiber of the distribution cable is accessed and terminated at each mid-span access location. The preterminated optical fiber may be directly connectorized and the connector routed to a respective optical connection node, or may be spliced to a pigtail and the pigtail routed to a respective optical connection node. Regardless, the at least one preterminated optical fiber is routed to a respective connection node through hollow connection node bodies that allow the optical fiber to be routed in a tension-free manner. The connection node bodies also link adjacent connection nodes together to form a linear chain of optical connection nodes, thus providing a distribution cable capable of accommodating any number of preterminated optical fibers while maintaining a diameter no greater than the diameter of any one of the connection nodes. Each connection node comprises a connector port having a connector adapter sleeve configured to receive the connectorized end of the preterminated optical fiber on the inside of the connector port and a connectorized end of a fiber optic branch cable or fiber optic drop cable on the outside of the connector port. The branch cable may be used to connect an optical fiber of the distribution cable to another distribution point, such as an optical network terminal. The drop cable may be used to connect an optical fiber from a subscriber premises to an optical fiber of the distribution cable, thereby extending an all-optical communications network to the subscriber premises.

In another exemplary embodiment, the present invention provides a factory-prepared fiber optic distribution cable comprising at least one mid-span access location that serves as a "tether attach point." One or more individual optical connection nodes are linked together at the end of a flexible tether that is attached to the distribution cable at the tether attach point. The linked optical connection nodes are capable of being slid along the length of the distribution cable, or alternatively, may be removed from the distribution cable and routed to a convenient location for receiving connectorized optical fibers of the branch cable or drop cable. In this case, the tether attach point is the location at which at least one optical fiber of the distribution cable is accessed and preterminated. Assuming enough optical fiber can be accessed from the distribution cable, the preterminated optical fiber may be directly connectorized and routed to its respective optical connection node. Typically, however, the preterminated optical fiber is spliced to a pigtail and routed to its respective optical connection node. Regardless, the preterminated optical fiber is routed to its respective connection node through the tether and any prior connection node body, both of which allow optical fiber routing in a tension-free manner. Adjacent connection node bodies are linked together in a linear fashion to form a chain of optical connection nodes, thus providing a distribution cable capable of accommodating any number of preterminated optical fibers. Each optical connection node comprises a connector port having a connector adapter sleeve configured to receive the connectorized end of the preterminated optical fiber on the inside of the connector port and a connectorized end of a fiber optic branch cable or fiber optic drop cable on the outside of the connector port. The branch cable may be used to connect an optical fiber of the distribution cable to another distribution point, such as an optical network terminal. The drop cable may be used to connect an optical fiber from a subscriber premises to an optical fiber of the distribution cable, thereby extending an all-optical communications network to the subscriber premises.

In yet another exemplary embodiment, the present invention provides a fiber optic distribution cable assembly comprising individual optical connection nodes for providing access to preterminated and pre-connectorized optical fibers. The distribution cable assembly includes a mid-span access location, one or more connection node housings, one or more connection node links, splice protection means and means for interconnecting at least one optical fiber of the distribution cable with at least one optical fiber of a fiber optic branch cable or a fiber optic drop cable. In an alternative embodiment, the fiber optic distribution cable assembly may further comprise slack storage means and a means for protecting the mid-span access location. In yet another alternative embodiment, the fiber optic distribution cable assembly may further comprise a tether attach point, tether attach point protection means and an overmolded protective element.

In yet another exemplary embodiment, the present invention provides a fiber optic distribution cable assembly having at least one optical fiber disposed within a tubular body, wherein the tubular body may include, but is not limited to, a buffer tube, a monotube or a tube formed from a water-swellable tape. In order to achieve a low profile mid-span access, a section of the cable sheath is removed in the factory to expose a length of the tubular body within the distribution cable. For each mid-span access location, the appropriate tubular body may be accessed at one or more points along the exposed length of the tubular body. Using the one or more access points, pre-selected optical fibers are preterminated by accessing and severing the desired optical fibers. The remaining optical fibers remain intact and continue along the distribution cable. In embodiments in which the distribution cable comprises ribbonized optical fibers (i.e., one or more fiber optic ribbons), a larger length of the tubular body, and typically almost the entire length of the tubular body within the removed section of the cable sheath, is accessed in order to separate and sever the pre-selected optical fibers from one or more fiber optic ribbons.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

Figure 1:
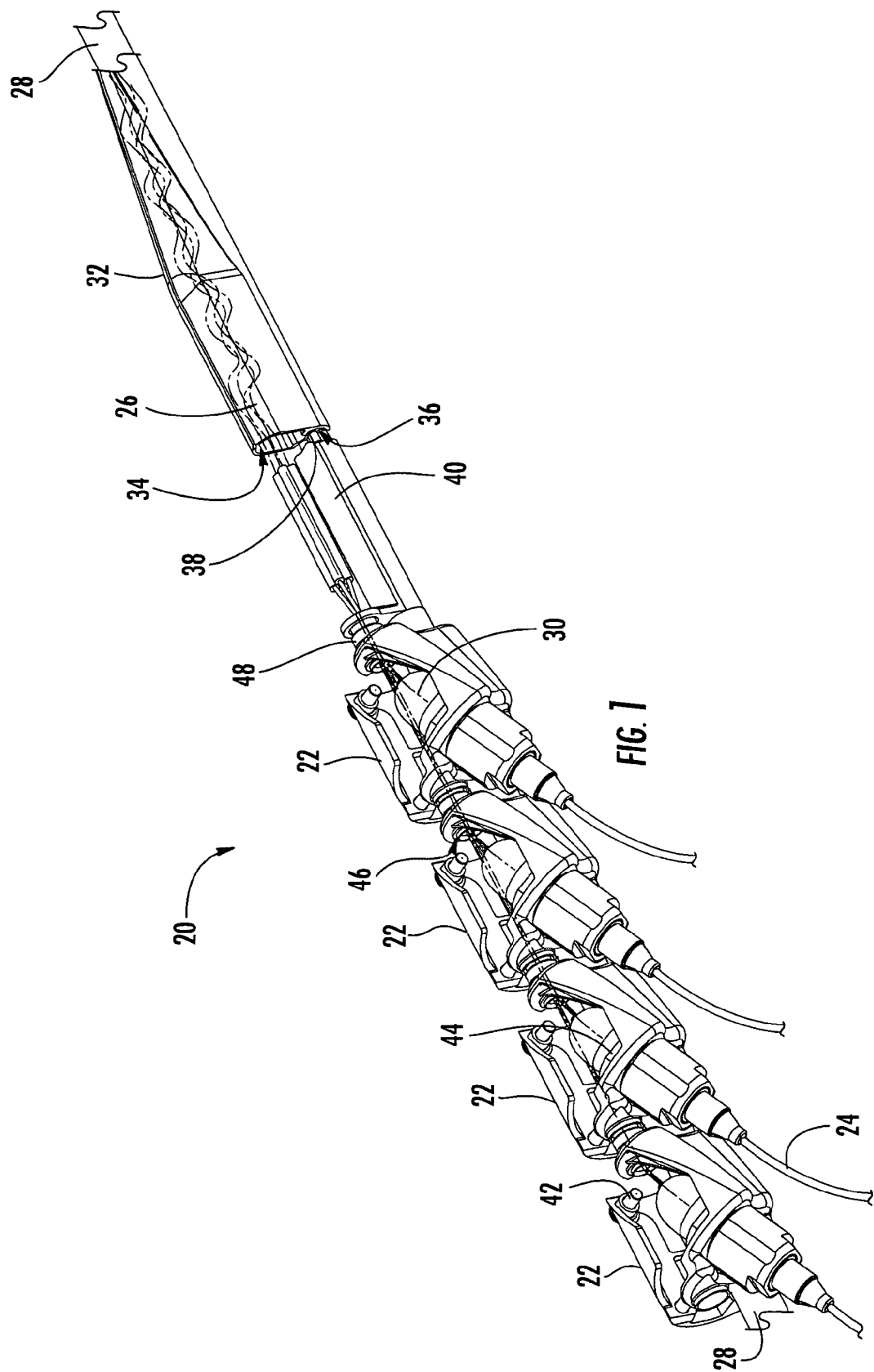
FIG. 1 is a perspective view of a fiber optic distribution cable in accordance with an exemplary embodiment of the preset invention comprising a plurality of articulated optical connection nodes linked together to form a linear chain of connector ports for receiving at least one preterminated and pre-connectorized optical fiber of the distribution cable and a connectorized optical fiber of a branch cable or drop cable.

The present invention will now be described more fully hereinafter with reference to the accompanying drawings in which exemplary embodiments of the invention are shown. However, the invention may be embodied in many different forms and should not be construed as limited to the embodiments set forth herein. These exemplary embodiments are provided so that this disclosure will be both thorough and complete, and will fully convey the scope of the invention and enable one of ordinary skill in the art to make, use and practice the invention. Like reference numbers refer to like elements throughout the various drawings.

In the various exemplary embodiments described herein, the present invention comprises a fiber optic distribution cable having at least one mid-span access location at which a plurality of articulated optical connection nodes are linked together to form a linear chain of connector ports for receiving at least one preterminated and pre-connectorized optical fiber of the distribution cable and a connectorized optical fiber of a branch cable or drop cable. Although the drawing figures show four optical connection nodes linked together at a respective mid-span access location, it is envisioned that any number of individual optical connection nodes may be linked together to provide a customized distribution and termination solution for a fiber optic communications network. At each mid-span access location, one or more preselected optical fibers are terminated and furcated from the plurality of optical fibers of the distribution cable. The preterminated optical fibers are then routed to respective optical connection nodes where they may be optically connected to respective optical fibers of one or more fiber optic branch cables or fiber optic drop cables. As used herein, "optically connected" includes any suitable means for joining optical fibers, such as fusion splicing, mechanically splicing, or mating opposing connectors provided on the ends of the optical fibers. For purposes of illustration, and not by way of limitation, the preterminated optical fibers of the distribution cable and the optical fibers of the branch cables or drop cables are described herein as being pre-connectorized (i.e., factory connectorized). Alternatively, however, the preterminated optical fibers of the distribution cable and the optical fibers of the branch cables or drop cables may be provided "splice-ready" and connectorized in the field. Accordingly, the optical connection nodes may or may not be configured with connector ports. Preferably, however, the optical fibers of the distribution cable are preterminated and pre-connectorized and the optical connection nodes are configured with connector ports in the factory. Likewise, the optical fibers of the branch cables or drop cables are preferably pre-connectorized so that the distribution cable and the branch cables or drop cables provide a true "plug-and-play" interconnection system, thereby enabling a less experienced and less skilled field technician to readily install the fiber optic communications network. The branch cable may be used to connect an optical fiber of the distribution cable to another distribution point, such as an optical network terminal. The drop cable may be used to connect an optical fiber from a subscriber premises to an optical fiber of the distribution cable, thereby extending an all-optical communications network to the subscriber premises. As used hereinafter in the description of the exemplary embodiments, "fiber optic drop cable" and "drop cable" should be understood to include any fiber optic cable, monotube, tether or like conduit for routing and protecting at least one optical fiber, including a fiber optic branch cable.

A fiber optic distribution cable according to the present invention comprises at least one predetermined mid-span access location along the length of the distribution cable for providing access to at least one preterminated optical fiber at an optical connection node. Each mid-span access location of the fiber optic distribution cable is designed and constructed such that the preterminated optical fibers are protected from exposure to adverse environmental conditions, such as dust, dirt, infestation and moisture, and in particular, wind driven rain. In preferred embodiments, the distribution cable comprises a plurality of mid-span access locations at predetermined spaced apart locations along the length of the distribution cable, thereby providing multiple distribution points for a fiber optic branch cable or termination points for a fiber optic drop cable. As will be described, the distribution points and termination points may be a "fixed" mid-span access location or may be a "floating" mid-span access location, also referred to herein as a "tether attach point," at which a tether is attached to the distribution cable. The fiber optic distribution cable may be wound upon a cable reel for shipping and deploying in an aerial installation using conventional aerial lashing equipment, or deploying in a buried installation, such as through a bore or conduit. Preferably, the fiber optic distribution cable is prepared and assembled in a factory, thus eliminating the need for first installing a fiber optic cable and then performing a mid-span access in the field, for example at a telephone pole or within an outside plant enclosure, such as a network terminal or a pedestal. A factory-prepared fiber optic distribution cable constructed in accordance with the present invention offers a communications service provider low-profile, flexible optical connection nodes that are protected during cable winding, shipping, deploying and network installation. Once the fiber optic distribution cable is deployed, preterminated and connectorized optical fibers of the distribution cable may be readily connected to connectorized optical fibers of fiber optic drop cables to extend an "all-optical" communications network closer to a subscriber premises.

In several of the embodiments illustrated herein, optical fibers accessed and terminated from the distribution cable may be spliced to optical fibers having an optical connector mounted on one end (i.e., a "pigtail"). The connectors are then routed to the connector port of one of the individual connection nodes. Alternatively, a connector may be mounted directly on the end of the terminated optical fiber (i.e., direct connectorized) and routed to the respective connector port. Optical fibers of the distribution cable that are not terminated may be managed and routed separately from the terminated optical fibers such that they extend uninterrupted through the distribution cable. Once the desired optical fibers are factory accessed, terminated, connectorized and routed to the connector ports, the distribution cable may be deployed in either an aerial installation or a buried installation. One or more pre-connectorized drop cables are then routed to the outside of the connector ports at any time subsequent to the initial installation of the distribution cable. In all embodiments, the connector ports may be adapted to accommodate a variety of connector types, such as but not limited to SC, LC, FC, ST, SC/DC, MT-RJ, MTP, MPO and other like single or multifiber ferrules now known or hereafter developed.

In all embodiments shown and described herein, different distribution cable types may be accommodated, such as monotube, loose tube, central tube, ribbon and the like. One example of a type of distribution cable that may be used in conjunction with the present invention is an ALTOS® dielectric cable available from Corning Cable Systems LLC of Hickory, N.C. The ALTOS® dielectric cable is a lightweight fiber optic cable designed for both conduit (buried) and lashed (aerial) installations. In another example, the distribution cable is a Standard Single-Tube Ribbon (SST-Ribbon™) cable available from Corning Cable Systems LLC of Hickory, N.C. The SST-Ribbon™ cable contains readily identifiable twelve-fiber ribbons in a gel-filled tube. Regardless, the distribution cable is preferably designed to provide stable performance over a wide range of temperatures and to be compatible with any telecommunications grade optical fiber. As used herein, the term "optical fiber" is intended to include all types of single mode and multi-mode light waveguides, including one or more bare optical fibers, coated optical fibers, loose-tube optical fibers, tight-buffered optical fibers, ribbonized optical fibers or any other expedient for transmitting light signals. In preferred embodiments, the distribution cable is flexible, easy to route and has no preferential bend.

Referring now to FIG. 1, a distribution cable assembly 20 having a plurality of articulated optical connection nodes 22 constructed in accordance with an exemplary embodiment of the present invention is shown. The distribution cable assembly 20 permits an optical fiber of one or more fiber optic drop cables 24 to be readily interconnected with a preterminated optical fiber 26 of a fiber optic distribution cable 28. In this embodiment, the preterminated optical fiber 26 is also pre-connectorized, and in particular, is spliced to a relatively short length of optical fiber 30 having an optical connector mounted on the end (i.e., a pigtail). As is well known and understood in the art, each drop cable 24 comprises a flexible transport tube containing one or more optical fibers connected to an outside plant optical connection terminal, such as a network interface deice (NID) at a subscriber premises. As shown, the fiber optic drop cable 24 is connectorized so that the drop cable 24 can be readily interconnected with the pre-connectorized optical fiber 30 of the distribution cable 28, as will be described. Thus, the distribution cable assembly 20 provides a convenient branch point or termination point in a fiber optic communications network for a field technician to readily install and subsequently reconfigure optical connections between the distribution cable 28 and a pre-connectorized drop cable 24 to provide communications service to a subscriber.

In all exemplary embodiments shown and described herein, each connection node 22 is configured with a connector port that is operable for receiving one or more pre-connectorized optical fibers 30 of the distribution cable 28 on the inside of the connector port and a connectorized optical fiber of the drop cable 24 on the outside of the connector port. As used herein, the term "connector port" is intended to broadly include an opening through the connection node 22 at which the connector mounted upon the end of the preterminated and pre-connectorized optical fiber 30 of the distribution cable 28 is optically connected to the connector of a pre-connectorized drop cable 24. As shown herein, the connector port may also include a factory-installed adapter 44 and a connector adapter sleeve (not shown) for aligning and maintaining the mating connectors in physical contact. In one embodiment, the connector adapter sleeve may be biased within the adapter 44 to ensure physical contact between the opposed end faces of the connectors. Preferably, the adapter 44 further provides an environmental seal at the optical connection between the pre-connectorized optical fiber 30 of the distribution cable and the pre-connectorized drop cable 24. The adapter 44 also transfers any tension load placed on the cables 28, 24 to the adapter 44, which in turn transfers any tension load to the adapter mounting provided on the connection node 22.

The distribution cable assembly 20 comprises one or more pre-engineered mid-span access locations (not shown) at predetermined positions along the length of the distribution cable 28. The mid-span access location and method of accessing optical fibers from the distribution cable 28 is described below and shown in FIG. 5. Each mid-span access location is the point at which a single fiber or a subset of optical fibers are accessed, terminated, furcated and routed away from the remaining optical fibers of the distribution cable 28. The mid-span access location is partially surrounded by a slack storage housing 32 that defines an interior compartment 34 for receiving and storing optical fiber slack, and a groove or C-shaped feature 36 for securing the slack storage housing 32 to the distribution cable 28. The slack storage compartment 34 accommodates excess length of optical fiber between the mid-span access location and the splice points, and may be used for re-splicing if needed (up to 2 or 3 times). The slack storage housing 32 is preferably made of a compliant material to allow for some deformation during winding, storage, shipping and deployment. The slack storage housing 32 may be secured to at least one of a portion of repaired cable sheath and/or a tubular body 38 exposed when the cable sheath is removed. A splice holder 40 is used to support and protect the fusion splice points between the preterminated optical fibers 26 and the pigtail optical fibers 30. The splice holder 40 is secured to a central member (not shown) of the distribution cable 28 or mechanically secured to the tubular body 38 in applications in which the central member is not accessible. Both the slack storage housing 32 and the splice holder 40 store and route the optical fibers 26, 30 in a tension-free manner. In an alternative embodiment, the access location, slack storage housing 32 and splice holder 40 are overmolded with a flexible encapsulating material. The encapsulating material and its degree of flexibility are selected based on the size and minimum bend radius of the distribution cable assembly 20. The overmolded encapsulating protects the optical fibers, ensures mechanical integrity (e.g., provides crush resistance) and seals the internal cavities of the slack storage housing 32 and splice holder 40 from adverse environmental conditions, such as dust, dirt, infestation and moisture, and in particular, wind driven rain.

Figure 2:
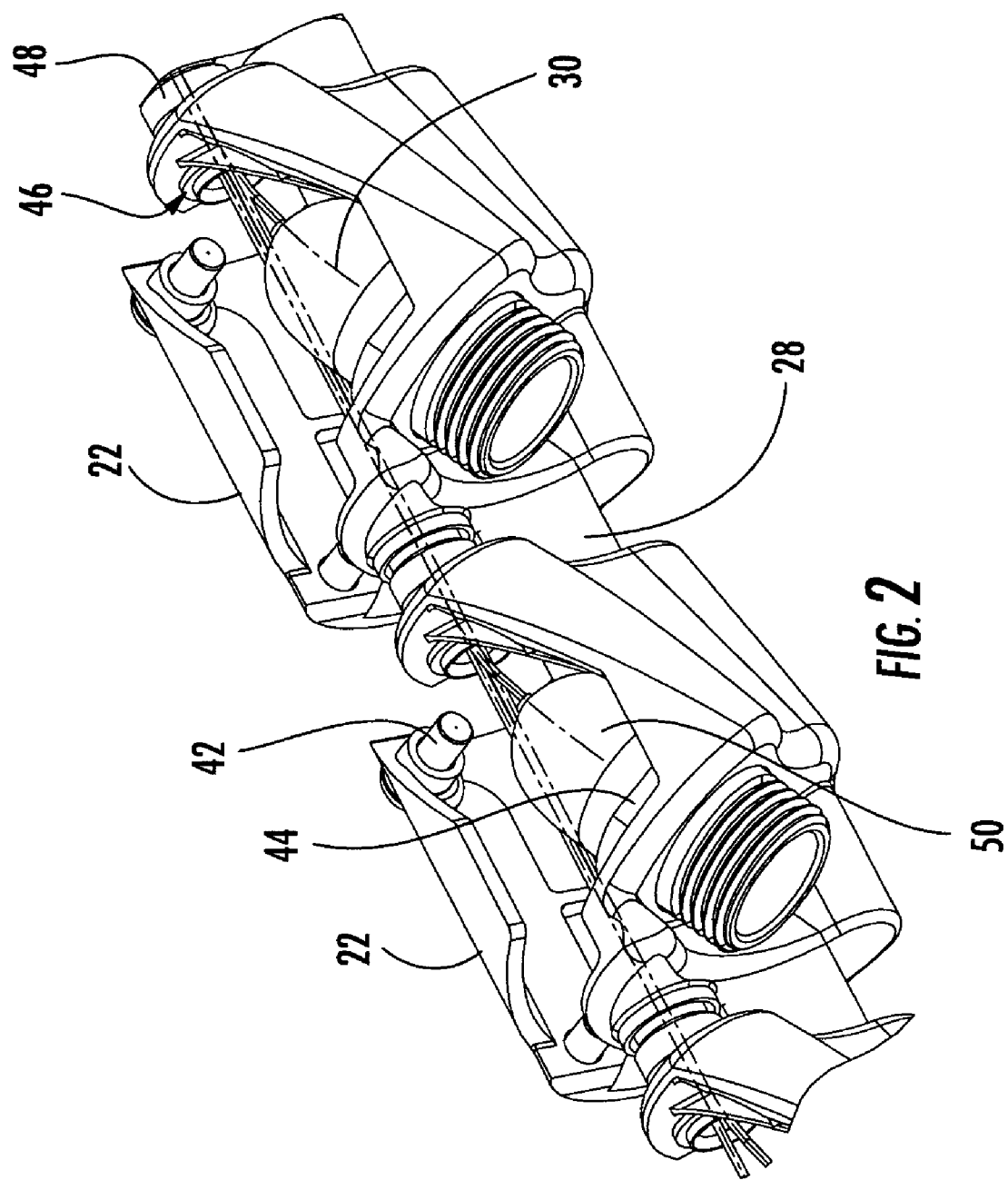
FIG. 2 is a perspective view of an adjacent pair of the optical connection nodes of FIG. 1 shown with the connector ports unoccupied and the dust caps removed.

Referring to FIGS. 1 and 2, each connection node 22 comprises a two-part housing that is secured around the distribution cable 28. The connection node 22 is secured around the distribution cable 28 using fasteners 42 such as, but not limited to screws, studs, nuts or bolts operable for holding two or more parts together. In one embodiment, the two parts of the housing may be hingedly affixed to each other. The connection node 22 forms a hardened housing for protecting the adapter 44 and connector adapter sleeve. In order to meet installation and axial pull strength requirements, it is preferred that the housing have material properties similar to that of steel, aluminum, brass, hard plastic or like materials capable of withstanding axial pulling forces of up to about 600 lbs. The housing is preferably made of a flame, impact and UV-resistant material designed to protect the optical fibers and optical connections in an aerial or buried environment. In addition, the housing may be molded from resins designed to resist environmental degradation. As shown, each connection node 22 is irregular in shape and has a relatively thin outer wall. If desired, stiffening ribs may be provided to strengthen the housing. The housing may have any desired shape, such as square, rectangular or oval, and the outer housing wall may have any suitable thickness.

Each connection node 22 further comprises an opening 46 on each end of the housing for receiving a hollow connecting link 48. Connecting links 48 are used to link adjacent connection nodes 22 together to form a linear chain of connection nodes 22, and are hollow in order to route the pre-connectorized optical fibers 30 along the node chain to their respective connection nodes 22. The connecting links 48 are preferably rigid to retain their shape, but define features for angular articulation between adjacent connection nodes 22 such that the linear chain of connection nodes has a preferential bend direction. The length of the individual connection nodes 22 and connecting links 48 is limited, and therefore, prevents tension on the optical fibers 30 that are routed through the center of the connecting links 48. The amount of angular articulation permitted by the connecting links 48 allows the chain of connection nodes 22 to follow a curved section, as it would encounter when pulling the distribution cable 28 through a conduit having a relatively small inner diameter or significant bends, or pulling the distribution cable over aerial lashing equipment, such as sheaves and rollers. Although not shown, a flexible metal or rubber bellows-type sealing member may be positioned over the connecting link 48 and secured to the housing in order to prevent water ingress or debris migration through the opening formed by the angular articulation between the connecting link 48 and the housing.

Still referring to the exemplary embodiment of FIG. 1, an optical fiber 30 having a preselected length and a connector mounted upon one of its ends (i.e., a pigtail) may be fed through a respective connection node 22 from the outside (i.e., the side from which the drop cable 24 is later attached). The pigtail is fed with its splice-ready un-connectorized end first through the respective adapter 44, then through the respective connecting link 48 and through any upstream connection nodes 22 and connecting links 48 to the splice holder 40 of the distribution cable assembly 20. The pre-connectorized optical fiber pigtail 30 is then optically connected to the appropriate preterminated optical fiber 26 of the distribution cable 28 in any suitable manner, for example by fusion splicing or mechanical splicing, as is commonly known in the art. In an alternative embodiment, the pre-connectorized optical fiber pigtail 30 may first be spliced to the appropriate preterminated optical fiber 26 of the distribution cable 28 and the connector then fed through the intermediary connecting links 48 and connection nodes 22 until it reaches the respective connection node 22. One assembly embodiment may be preferred over the other based on the number of preterminated optical fibers 26 and the size of the connector mounted upon the ends of the pre-connectorized optical fiber pigtails 30 in relation to the inner diameter of the connecting links 48.

Although four connection nodes 22 are shown for interconnecting up to four pre-connectorized drop cables 24 to preterminated and pre-connectorized optical fibers 30 of the distribution cable 28, it is envisioned that the chain of connection nodes 22 may be lengthened to accommodate any number of connection nodes 22 and drop cables 24. Typically, however, the chain is configured with no less than four and no more than twelve connection nodes 22. Thus, it is conceivable that the distribution cable assembly 20 may accommodate any number of pre-connectorized drop cables 24, for example from one to twelve or more. Pre-connectorized optical fiber pigtails 30 of varying lengths may correspond to the placement of the respective connection nodes 22. For example, a pigtail 30 routed from the most downstream connection node 22 has a length greater than the pigtail routed from the most upstream connection node 22. Substantially similar length pigtails 30 may be used for all connection nodes 22 in relatively short chains of connection nodes 22 in embodiments in which the slack storage housing 32 is capable of storing all of the excess lengths of optical fiber.

Figure 3:
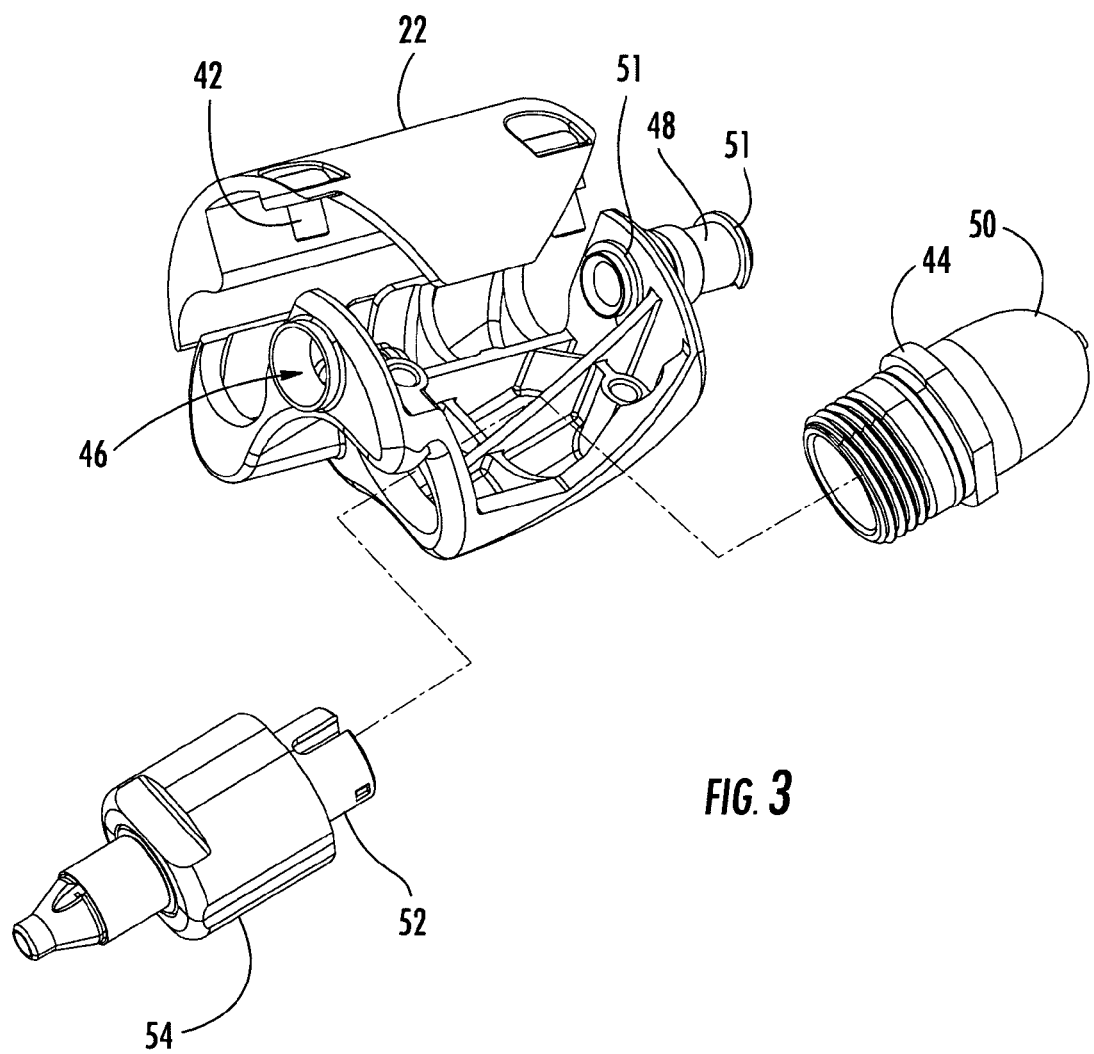
FIG. 3 is an exploded perspective view of a typical optical connection node shown in a partially assembled configuration with the connection node housing in an opened position to expose the interior cavity of the optical connection node.

Referring to FIGS. 2 and 3, the inside of each adapter 44 is preferably covered with a flexible boot 50 that functions to route the pre-connectorized optical fiber 30 into the respective adapter 44. In an alternative embodiment, the flexible boot 50 may further provide a seal around the optical fiber 30 and a seal between the flexible boot 50 and the adapter 44. The flexible boot 50 may be screwed or snap-fit to the adapter 44 in order to secure it in place. In turn, the adapter 44 may be secured to the housing by a snap-fit or a coupling nut. Referring to FIG. 3, the connecting links 48 are secured to the housing using crescent rings 51 that are retained by features defined on the outer surface of the connecting links 48. A plug assembly 52 of a pre-connectorized fiber optic drop cable 24 is secured to the adapter 44 from the outside of the connection node 22 in any suitable manner, such as a snap-fit, a bayonet-type fitting or a coupling nut. In the exemplary embodiments shown and described herein, a coupling nut 54 of the plug assembly 52 is screwed onto external threads provided on adapter 44. The adapter 44 and the plug assembly 52 of the fiber optic drop cable 24 sealingly engage one another. For compact design, each adapter 44 and plug assembly 52 is positioned in the connection node 22 at a predetermined angle relative to the longitudinal axis defined by the distribution cable 28. Preferably, the predetermined angle is between about 15 degrees and about 60 degrees, and more preferably is between about 20 degrees and about 35 degrees from the longitudinal axis defined by the distribution cable 28. The outer contour of the housing permits close stacking of adjacent connection nodes 22 and serves to eliminate sharp edges that may cause the connection nodes 22 to catch when pulling the cable assembly 20 through a conduit having a relatively small inner diameter or significant bends, or through aerial lashing equipment, such as sheaves and rollers. In general, the design of the outer contour of the housing minimizes protruding surfaces in either pulling direction. Although not shown, each adapter 44 is preferably occupied by a flexible component that functions as both a dust cap and to fill the gap between adjacent connection nodes 22 in order to reduce the possibility of snagging during deployment prior to installing a pre-connectorized drop cable 24 into a respective adapter 44. In alternative embodiments, the entire chain of connection nodes 22 and the mid-span access location may be temporarily covered with a flexible mesh material or overmolded with a flexible encapsulating material for deployments in which the cable is to be pulled through a conduit.

Figure 4:
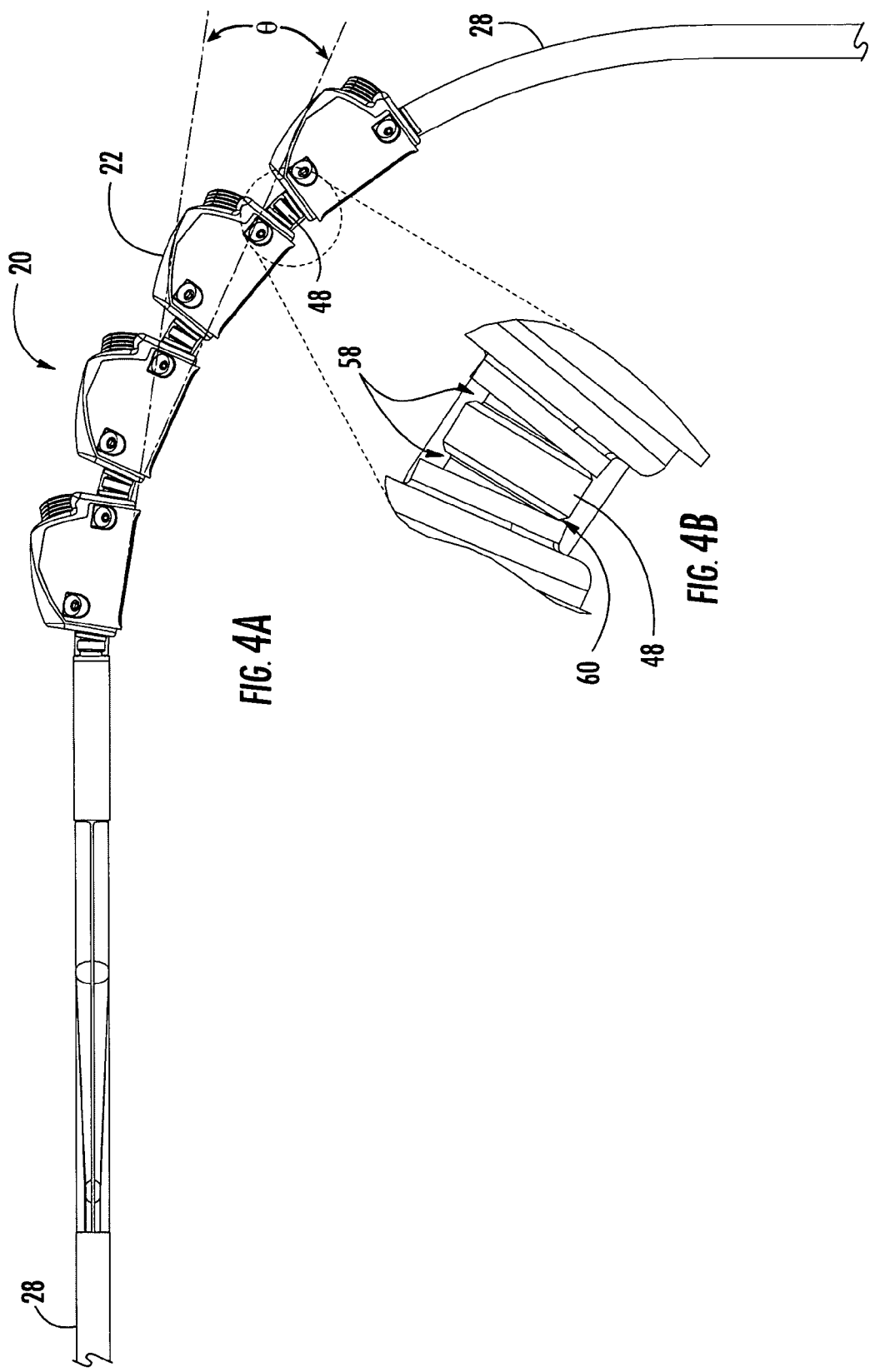
FIG. 4A is a perspective view of the fiber optic distribution cable of FIG. 1 illustrating the flexibility of the articulated optical connection nodes that permit the distribution cable to be deployed through a conduit having a relatively small inner diameter or significant bends, or to be deployed using conventional aerial lashing equipment.
FIG. 4B is a detail view of a portion of the fiber optic distribution cable of FIG. 4a illustrating the amount of angular articulation between adjacent optical connection nodes.

Referring now to FIGS. 4A and 4B, the relationship between the distribution cable 28 and the hollow connecting links 48 forms a relatively stiff, but resilient axis. When routing the cable assembly 20 through, for example, a conduit having significant bends or through sheaves or rollers, the cable assembly 20 will inherently assume an orientation that allows the cable assembly 20 to flex. The fixed maximum length of the hollow connecting links 48 protects the optical fibers from excessive tension. In a preferred embodiment, the node-to-node angle θ (FIG. 4A) is preferably at least about 15 degrees, more preferably at least about 20 degrees, and even more preferably at least about 45 degrees. A node-to-node angle of this magnitude is required to enable the cable assembly 20 to be routed around a radius of about 9-inches. The necessary angular articulation of the hollow connecting links 48 is accomplished by reduced diameter features 58 defined by the structural design of connecting links 48. The wedge-shape 60 of features 58 limits the travel of the connection node 22 in the inward direction.

Figure 5:
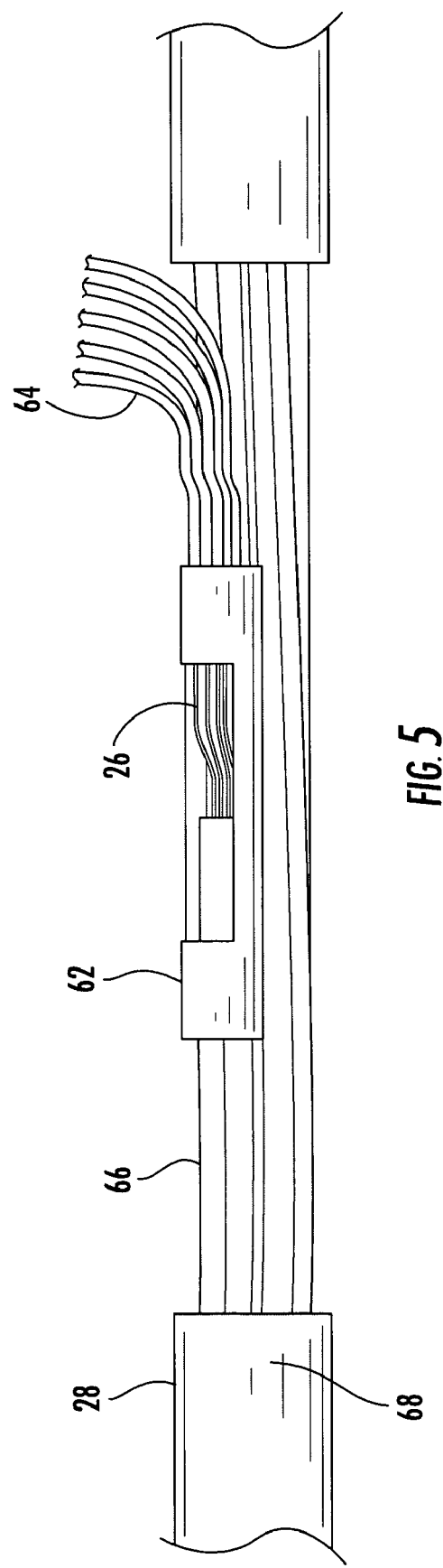
FIG. 5 is a plan view of a typical mid-span access location illustrating an exemplary furcation means for separating and routing the preterminated optical fibers of the distribution cable of FIG. 1.

Referring to FIG. 5, an exemplary embodiment of a typical mid-span access location is shown. The accessed and terminated 250 μm optical fibers 26 of the distribution cable 28 are routed through a fiber transition piece 62 and optionally may be secured to 900 μm protective tubes 64. In preferred embodiments, the fiber transition piece 62 and the protective tubes 64 are assembled and secured together using an epoxy material prior to inserting the optical fibers 26 into the protective tubes 64. In one method of assembly, an optical fiber length of about 9 to 15 inches is withdrawn from a tubular body 66 (e.g., a buffer tube) of the distribution cable 28, routed through an optical fiber opening (not shown) formed in the fiber transition piece 62, and inserted into the protective tubes 64. The fiber transition piece 62 may be secured to the tubular body 66 or to a structural member of the distribution cable 28, such as a strength member (not shown), or both in a known manner.

The fiber transition piece 62 may be rigid or somewhat flexible to permit the fiber transition piece 62 to bend slightly and thereby conform to the curvature of the tubular body 66 or other structure to which it is attached. The fiber transition piece 62 is positioned within the mid-span access location to coincide with the exit point of the optical fibers 26 from the distribution cable 28 and to protect the opened portion of the tubular body 66. In one embodiment, the fiber transition piece 62 is snapped onto the tubular body 66 over the exit point of the optical fibers 26. Once all of the optical fibers 26 have been routed, the opening provided in the fiber transition piece 62 may be filled with a sealing material, such as a silicone elastomer or epoxy material, to seal the transition point, prevent torque of the fiber transition piece 62 and prevent any water-blocking gel that may be present from leaking out of the tubular body 66.

In a particular embodiment, the fiber transition piece 62 comprises a molded body defining a first opening for receiving the optical fibers 26 exiting from the tubular body 66. The fiber transition piece 62 further defines a second opening for routing the optical fibers 26 into an optical fiber slot (not shown). The optical fiber slot is operable for maintaining the optical fibers in a linear array and securing the protective tubes 64, if utilized. The fiber transition piece 62 may be specifically designed to transition from one to twelve optical fibers from the tubular body 66. The appropriate optical fiber slot should be positioned downstream of the exit point of the optical fibers 26 so that the optical fibers 26 are transitioned smoothly without violating their minimum bend radius.

To achieve a desirable low-profile mid-span access location, a section of the cable sheath 68 is severed and removed to expose the at least one tubular body 66 within the distribution cable 28. The exposed length of the tubular body 66 may vary. However, in a preferred embodiment, the length ranges between about 9 inches and about 15 inches. The cable sheath 68 may be ring cut and removed using a cable access tool operable for slitting the cable sheath 68 without damaging the tubular body 66 disposed within the distribution cable 28. As described above, the exposed length of the tubular body 66 allows for about 9 to 15 inches of optical fiber to be withdrawn from the tubular body 66 for fusion or mechanical splicing to a pigtail, or for direct connectorization.

For a given mid-span access location, the appropriate tubular body 66 may be accessed in at least two places using a standard No-Slack Optical Fiber Access Tool (NOFAT) available from Corning Cable Systems LLC of Hickory, N.C. The NOFAT is suitable for use in situations in which a minimal amount of tubular body slack can be accessed. The NOFAT provides a guide that allows a scalpel to open a section of the tubular body 66 without cutting completely through the tubular body 66 or the optical fibers disposed within the tubular body 66. The NOFAT is compatible with standard Corning Cable Systems ALTOS® Cable tube sizes. As described herein, two cuts, typically about 9 to 15 inches apart, are made on the tubular body 66. As will be understood by those skilled in the art, at least two cuts are advantageous for removing one or more optical fibers 26 from a tube filled with a water-blocking gel. Starting at the downstream tube cut point, a predetermined number of 250 μm optical fibers 26 are located and severed. In a tube comprising twelve optical fibers, for example, four or eight optical fibers 26 may be preterminated. The remaining optical fibers disposed within the tubular body 66 remain intact and continue through the distribution cable 28. The severed optical fibers 26 are then fished out of the upstream tube cut point, on the same tubular body 66, thereby exposing about 9 to 15 inches of optical fiber length. The minimum bend radius of the optical fibers 26 should not be violated during the process of fishing-out the fibers. After removing the optical fibers 26 from the tubular body 66, any water-blocking gel present within the tubular body 66 is cleaned off of the exposed length of the optical fibers 26.

To achieve a desirable low-profile mid-span access location with a distribution cable 28 comprising ribbon fibers within a tubular body 66, an entire section of the cable sheath 68 and tubular body 66 is severed and removed to expose the fiber ribbons. The exposed length of the tubular body 66 may vary. However, in a preferred embodiment, the length of the tubular body 66 ranges between about 9 and about 15 inches. Starting at the downstream end of the fiber ribbons, a predetermined number of 250 μm optical fibers 26 are located and severed. In a ribbon comprising twelve optical fibers, for example, four or eight optical fibers 26 may be preterminated. The remaining optical fibers remain intact and continue through the distribution cable. The severed optical fibers 26 are then separated from the ribbon, presenting about 9 to 15 inches of optical fiber length. The minimum bend radius of the optical fibers 26 should not be violated during the process of accessing, severing or separating the optical fibers 26.

In both methods of accessing the optical fibers 26, the tubular body 66 and cable sheath 68 may be repaired and protected using either a heat shrinkable material or by overmolding the mid-span access location with a flexible encapsulating material. In one embodiment, the heat shrinkable material is glue-lined to provide a more secure repair. The heat shrinkable material or overmolded encapsulating material provides sealing and protection (e.g., crush resistance) of the optical fibers 26 accessed and severed at the mid-span access location. Alternatively, the cable sheath 68 and tubular body 66 may be repaired with a self-fusing or a self-amalgamating tape in a known manner.

Figure 6:
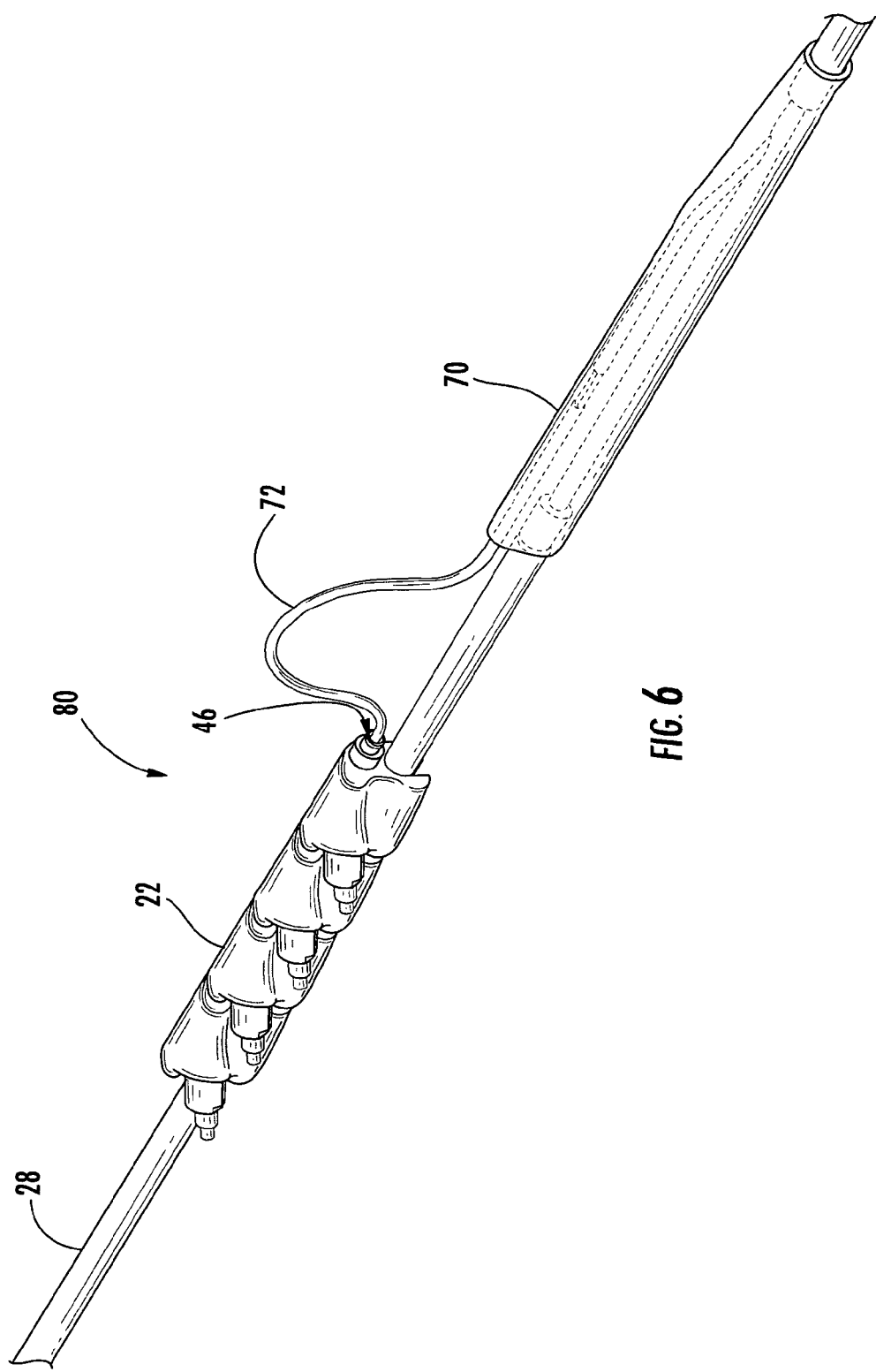
FIG. 6 is a perspective view of a fiber optic distribution cable in accordance with another exemplary embodiment of the present invention comprising a plurality of optical connection nodes linked together to form a linear chain of connector ports at the end of a tether attached to the distribution cable at a tether attach point such that the connector ports may be slid along the length of the distribution cable to a convenient location for receiving a connectorized optical fiber of a branch cable or drop cable.

Referring to FIG. 6, a distribution cable assembly 80 constructed in accordance with another exemplary embodiment of the present invention is shown. In this embodiment, a linear chain of connection nodes 22 is slidably attached to the distribution cable 28 instead of being fixed in position adjacent the mid-span access location as in the embodiments previously described. Thus, the entire chain of connection nodes 22 is slidable along the length of the distribution cable 28 relative to the mid-span access location. As previously described, the distribution cable 28 is accessed at a mid-span access location and optical fibers 26 are preterminated and routed separately from the remaining optical fibers of the distribution cable 28. The mid-span access location is covered and protected using either a heat shrinkable material or an overmolded flexible encapsulating material 70. The encapsulating material 70 protects and seals the mid-span access location and optical fibers, and further functions as a tether attach point. A tether 72 having a preselected length is used to attach the chain of connection nodes 22 to the mid-span access location. The tether 72 also functions to protect and route the preterminated and spliced optical fibers 30 from the mid-span access location to the respective connection nodes 22. The tether 72 enters the first connection node 22 through a connecting link opening 46 provided in the housing of the first connection node 22. As previously described, a crescent ring or another fastener may be used to secure the tether to the chain of connection nodes 22. It will be readily apparent and well understood by one of ordinary skill in the art that inside the overmolded encapsulating material 70, at least one terminated optical fiber 26 of the distribution cable 28 is spliced to a relatively short length of optical fiber having a connector mounted on the end (i.e., a pigtail) in any known manner, such as by fusion splicing or mechanical splicing. Strain relief members (not shown) provided on the tether 72 may also be secured to the chain of connection nodes 22, the overmolded encapsulating material 70, or both.

Figure 7:
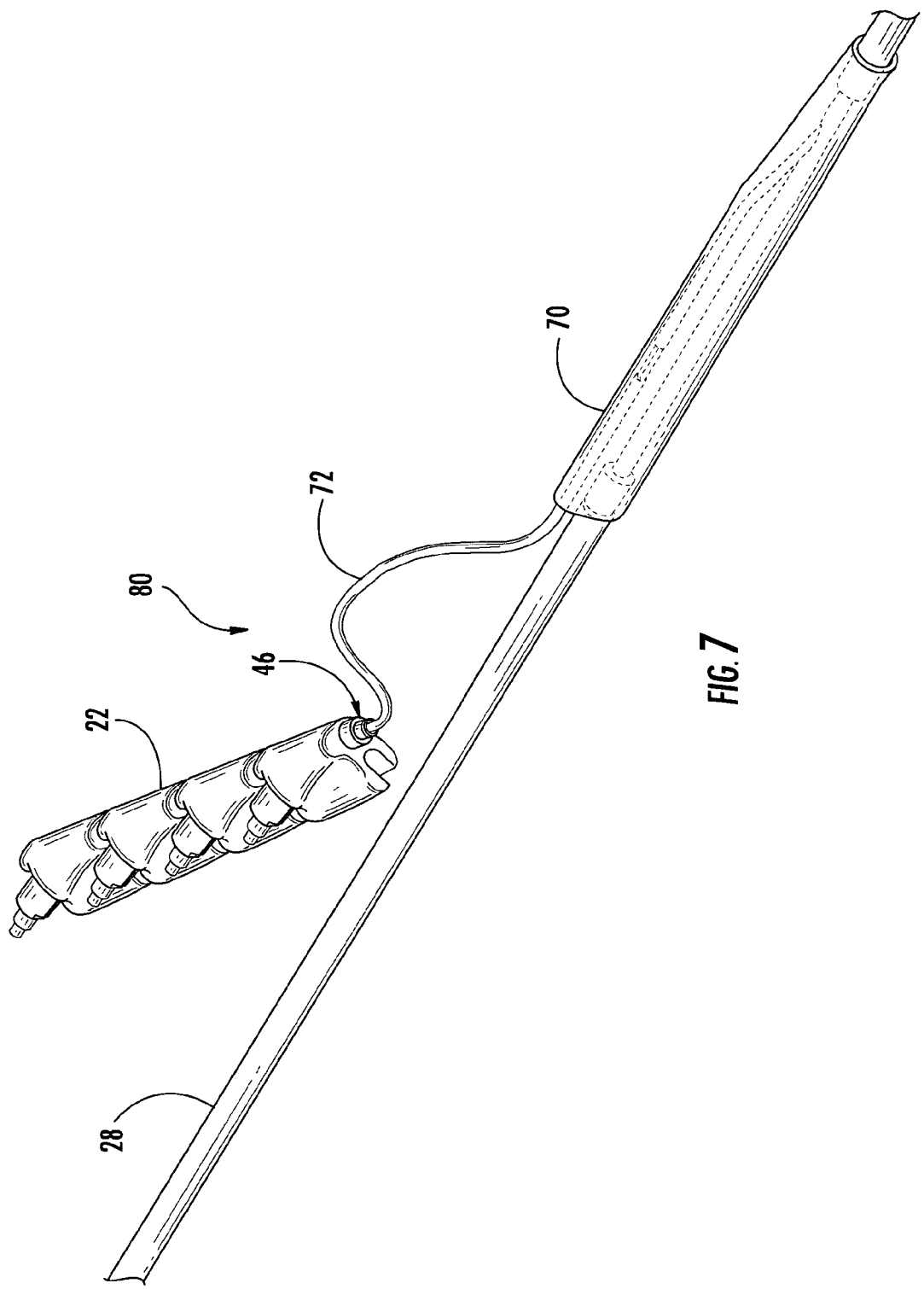
FIG. 7 is a perspective view of the fiber optic distribution cable of FIG. 6 shown with the linear chain of connector ports removed from the distribution cable such that the connector ports may be moved to a convenient location for receiving a connectorized optical fiber of a branch cable or drop cable.

While the linear chain of connection nodes 22 depicted in FIG. 6 remains attached to the distribution cable 28 and is slidable along the length of the distribution cable 28, the linear chain of connection nodes 22 depicted in FIG. 7 is removable from the distribution cable 28 and may be mounted in an alternative mounting location, such as a telephone pole or outside plant terminal. As a result, the preselected length of the tether 72 provides a field technician with sufficient slack to position the chain of connection nodes 22 in a location that is convenient to initially configure the optical connections and to subsequently add, remove or reconfigure the optical connections. As previously described with respect to the embodiment shown in FIG. 6, the distribution cable 28 is accessed at a mid-span access location and optical fibers 26 are preterminated and routed separately from the remaining optical fibers of the distribution cable 28. The access location is covered and protected using either a heat shrinkable material or an overmolded flexible encapsulating material 70. The encapsulating material 70 protects and seals the mid-span access location and the optical fibers 26, and further functions as a tether attach point. The tether 72 also functions to protect and route the preterminated and spliced optical fibers 30 from the mid-span access location to the respective connection nodes 22. The tether 72 enters the first connection node 22 through a connecting link opening 46 provided in the housing of the first connection node 22. As previously described, a crescent ring or another fastener may be used to secure the tether to the chain of connection nodes 22. It will be readily apparent and well understood by one of ordinary skill in the art that inside the overmolded encapsulating material 70, at least one terminated optical fiber 26 of the distribution cable 28 is spliced to a relatively short length of optical fiber having a connector mounted on the end (i.e., a pigtail) in any known manner, such as by fusion splicing or mechanical splicing. Strain relief members (not shown) provided on the tether 72 may also be secured to the chain of connection nodes 22, the overmolded encapsulating material 70, or both.

Figure 8:
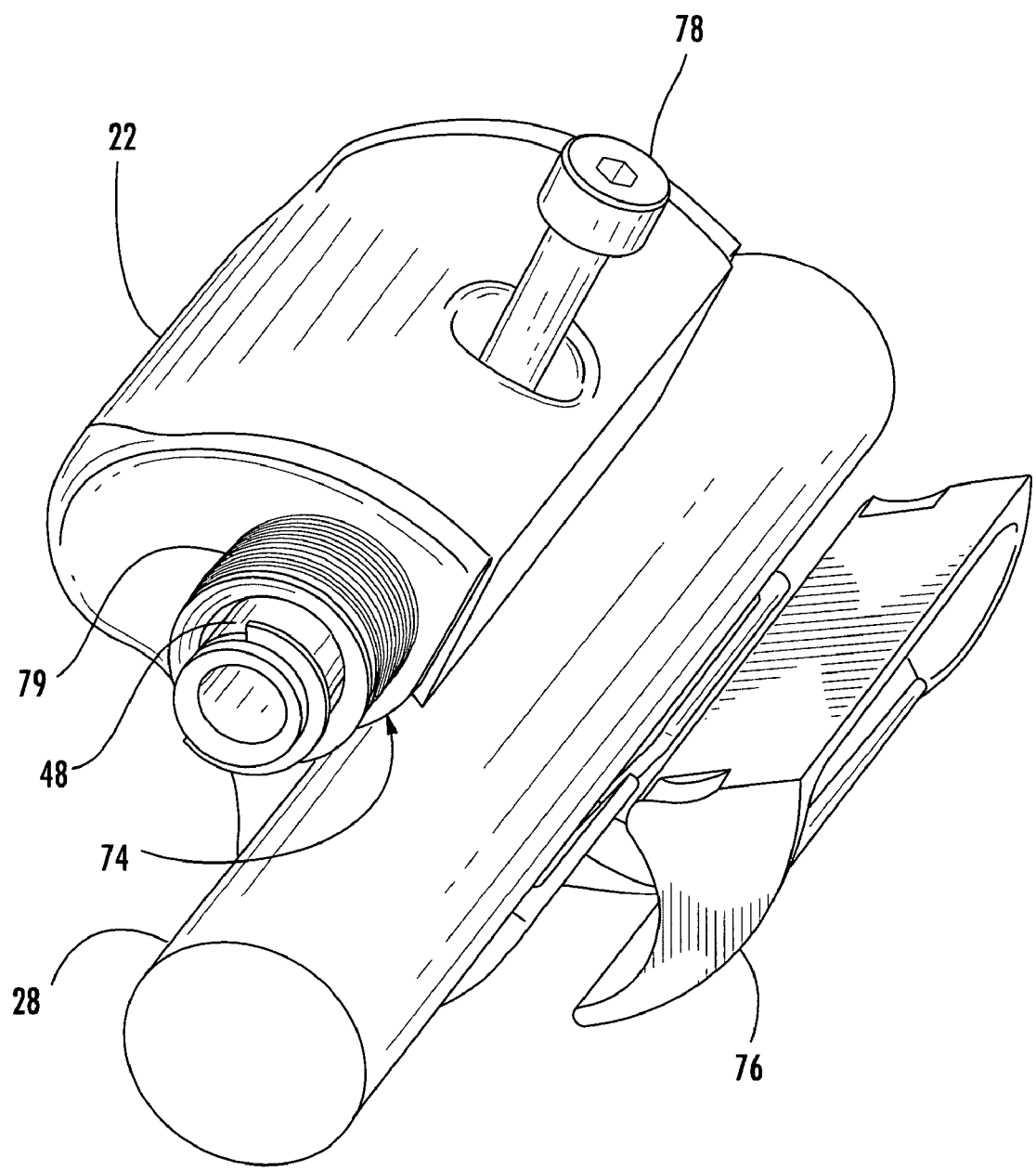
FIG. 8 is a perspective view of a connection node housing according to another exemplary embodiment of the present invention defining a groove for receiving a fiber optic distribution cable and a hinged feature for removably securing the connection node housing to the distribution cable.

Referring to FIG. 8, a perspective view of the housing of a typical connection node 22 used in the embodiments described in FIGS. 6 and 7 is shown. The housing defines a groove 74 for receiving a distribution cable 28 and a hinged housing portion 76 for slidably and/or removably securing the connection node 22 to the distribution cable 28. The groove 74 receives the distribution cable 28 and the hinged portion 76 closes around and substantially surrounds the distribution cable 28. One or more fasteners 78 may be used to hold the housing portions together in a closed configuration. The fastener 78 may be loosened slightly in order to slide the connection node 22, or the entire linear chain of connection nodes 22, along the length of the distribution cable 28. Alternatively, the fastener 78 may be loosened significantly or removed entirely in order to open the hinged housing portion 76 and release the connection node(s) 22 from the distribution cable 28. In one embodiment, each housing may comprise a hinged housing portion 76 for securing the respective connection node 22 to the distribution cable 28. In an alternative embodiment, only the housings on each end of the linear chain of connection nodes 22 is secured to the distribution cable 28. FIG. 8 also illustrates the flexible metal or plastic bellows 79 that functions to seal the space between the connecting link 48 and the housing of the connection node 22.

In another embodiment of the present invention, the connection node 22 that is furthest downstream from the mid-span access location of the cable assembly 20 may function as an anchor. In an alternative embodiment, the cable assembly 20 may be completed by a separate anchor (not shown) adjacent to the connection node 22 that is located farthest from the mid-span access location. The anchor is connected via another connecting link 48 and is secured to the distribution cable 28. The anchor functions to prevent the linear chain of connection nodes 22 from being wrapped around the distribution cable 28 in a helical fashion. The anchor also provides lead-in geometry for deployments in which the cable assembly 20 is pulled in a reverse direction.

Permissible variations in proportions and alternatives in elements may perform similar functions. In one example, for low connection node 22 counts, the distribution cable 28 may be accessed on both sides of the connection node chain, allowing the preterminated optical fibers 26 to be severed on the far end of the chain and retrieved at the near end. This would allow for direct connectorization and eliminate the need for splice points. However, the ability to retrieve a severed optical fiber 26 from a gel filled buffer tube limits the length of the optical fiber 26, and therefore, the number of connection nodes 22 that can be obtained at the mid-span access location. Also, slack storage may be sacrificed if the production process and the product life do not require excess lengths of optical fiber for reworking the connectors. Further, each connection node 22 may contain more than one optical connector in a symmetric or asymmetric position, depending on the network size and transmission requirements. For individual connection nodes 22 with only a single optical connector, the fan-out tubing and/or slack storage may be integrated into the housing of the connection node 22 in order to reduce the complexity of the distribution cable assembly 20. Further, the angular placement of the connector may vary depending on the network architecture and available space. In the applications described above, an angular placement of about 20 degrees to about 35 degrees relative to the longitudinal axis of the distribution cable 28 is preferred. However, given enough space, an angular placement of up to 90 degrees is permissible.

The exemplary embodiments of a distribution cable assembly comprising a plurality of articulated optical connection nodes linked together to form a linear chain of connection nodes 22 shown and described herein provide a number of significant advantages over previously known termination and branch points. For purposes of example only, and not by way of limitation, the distribution cable assembly provides the ability to fit several connection nodes into a single space-saving assembly, while maintaining flexibility of the distribution cable for deployment through a conduit having a relatively small inner diameter or significant bends, or through sheaves and rollers. Thus, the distribution cable assembly may be deployed underground through buried conduit having an inner diameter of less than about 2 inches, or aerially using conventional aerial lashing equipment, while the cross-sectional profile of the cable assembly remains constant for any number of individual connection nodes due to the linear orientation of the chain of connection nodes. Preterminated and pre-connectorized optical fibers of the distribution cable are routing through the assembly in a tension-free manner via an isolated, semi-rigid optical fiber path. The hardened assembly is suitable for outside plant applications and is capable of withstanding deployment pulling forces in excess of about 600 lbs. The flexibility of the distribution cable assembly results in a bend radius as low as about 9 inches (200 mm). Importantly, each mid-span access location and respective chain of connection nodes may be added to the distribution cable without the pre-assembly of shrink tubes or other components surrounding the cable.

In addition to the advantages described above, the distribution cable assembly constructed in accordance with the invention provides a field technician with the ability to readily connect, disconnect and reconfigure pre-connectorized fiber optic drop cables to "quick-connect" or "plug-and-play" type adapters located within the optical connection nodes. In addition, pre-connectorized optical fibers of the distribution cable may be routed to and installed within the adapters in the factory. Thus, a field technician is not required to enter the individual connection nodes at the mid-span access location in order to make subsequent optical connections of the pre-connectorized drop cables to preterminated and pre-connectorized optical fibers of the distribution cable. Further, the distribution cable assembly of the present invention including connection nodes defining connector ports eliminates the need to perform fusion or mechanical splices in the field.

The foregoing is a description of various embodiments of the invention that are given here by way of example only. Although distribution cable assemblies having a plurality of articulated optical connection nodes linked together to form a linear chain of connection nodes along the length of a distribution cable have been described with reference to preferred embodiments and examples thereof, other embodiments and examples may perform similar functions and/or achieve similar results. All such equivalent embodiments and examples are within the spirit and scope of the present invention and are intended to be covered by the appended claims.

The invention claimed is:

1. A fiber optic distribution cable comprising:
at least one mid-span access location;
at least one preterminated optical fiber accessed from the distribution cable at the mid-span access location; and at least one optical connection node attached to the distribution cable adjacent the mid-span access location for providing access to the at least one preterminated optical fiber, the optical connection node configured to receive a connector mounted on an end of the preterminated optical fiber; and wherein the at least one connection node comprises a housing for receiving the distribution cable and a generally hollow connecting link defining an opening for receiving and routing the at least one preterminated optical fiber of the distribution cable.

2. The fiber optic distribution cable of claim 1, wherein the at least one optical connection node comprises a plurality of connection nodes linked together to form a linear chain of connection nodes.

3. The fiber optic distribution cable of claim 2, further comprising a tether for routing and protecting the at least one preterminated optical fiber, the tether having a first end attached to the distribution cable at the mid-span access location and a second end attached to the linear chain of connection nodes, and wherein the linear chain of connection nodes are slidably attached to the distribution cable.

4. The fiber optic distribution cable of claim 2, further comprising a tether for routing and protecting the at least one preterminated optical fiber, the tether having a first end attached to the distribution cable at the mid-span access location and a second end attached to the linear chain of connection nodes, and wherein the linear chain of connection nodes are removably attached to the distribution cable.

5. The fiber optic distribution cable of claim 2, wherein each of the connection nodes is articulated relative to an adjacent one of the plurality of connection nodes.

6. The fiber optic distribution cable of claim 1, wherein the at least preterminated optical fiber is connectorized and wherein the at least one connection node further comprises an adapter positioned within the housing for receiving the at least one preterminated and connectorized optical fiber of the distribution cable.

7. The fiber optic distribution cable of claim 6, wherein the adapter defines an inside portion for receiving the at least one preterminated and connectorized optical fiber of the distribution cable and an outside portion for receiving a connectorized optical fiber of a fiber optic branch cable or fiber optic drop cable.

8. The fiber optic distribution cable of claim 1, wherein the housing of the connection node comprises a hinged portion for permitting the housing to be opened and positioned around the distribution cable.

9. The fiber optic distribution cable of claim 1, further comprising a slack storage housing that is secured to the distribution cable and at least partially surrounds the mid-span access location, the slack storage compartment defining an interior compartment for receiving and storing an excess length of the at least one preterminated optical fiber of the distribution cable.

10. The fiber optic distribution cable of claim 1, further comprising a splice holder adjacent the at least one connection node for supporting and protecting a splice between the at least one preterminated optical fiber of the distribution cable and a connectorized optical fiber to form a preterminated and connectorized optical fiber that is received by the at least one connection node.

11. The fiber optic distribution cable of claim 1, wherein the diameter of the at least one connection node is sized to pass through a conduit having an inner diameter not less than about 2 inches.

12. The assembly of claim 1, wherein the mid-span access location is overmolded with a flexible encapsulating material.

13. A fiber optic distribution cable assembly comprising:
a distribution cable comprising a plurality of optical fibers and having at least one mid-span access location along the length of the distribution cable, at least one of the plurality of optical fibers accessed and terminated from the distribution cable at the mid-span access location; and
a plurality of optical connection nodes attached to the distribution cable adjacent the mid-span access location for receiving and providing access to the at least one terminated optical fiber, the plurality of connection nodes articulated relative to one another; and
wherein the at least one optical fiber terminated from the distribution cable is connectorized and wherein each connection node comprises an adapter configured for receiving the terminated and connectorized optical fiber of the distribution cable within an inside portion of the adapter and a connectorized optical fiber of a fiber optic branch cable or fiber optic drop cable within an outside portion of the adapter.

14. The assembly of claim 13, wherein the plurality of articulated optical connection nodes are linked together to form a linear chain of connection nodes having a preferential bend direction.

15. The assembly of claim 13, wherein the distribution cable has a bend radius of at least about 9 inches at the mid-span access location.

16. The assembly of claim 13, wherein each connection node comprises a generally hollow connecting link for receiving and routing the at least one optical fiber terminated from the distribution cable and a housing comprising a hinged portion for positioning the connection node round the distribution cable.

17. The assembly of claim 13, further comprising a slack storage housing that is secured to the distribution cable and at least partially surrounds the mid-span access location, the slack storage compartment defining an interior compartment for receiving and storing an excess length of the at least one optical fiber terminated from the distribution cable.

18. The assembly of claim 13, wherein the mid-span access location is overmolded with a flexible encapsulating material.

19. A fiber optic communications network comprising:
a fiber optic distribution cable comprising a plurality of optical fibers and at least one mid-span access location along the length of the distribution cable for accessing and terminating preselected ones of the plurality of optical fibers;
a plurality of optical connection nodes linked together adjacent the mid-span access location to form a linear chain of individual connection nodes, each connection node configured to receive a connector mounted upon an end of at least one of the preselected optical fibers and to interconnect the at least one preselected optical fiber with an optical fiber of a fiber optic branch cable or a fiber optic drop cable; and
a tether having a first end attached to the distribution cable at the mid-span access location and a second end attached to the linear chain of connection nodes such that the linear chain of connection nodes are removably attached to the distribution cable.

20. The fiber optic communications network of claim 19, wherein the at least one preterminated optical fiber of the distribution cable is connectorized and the optical connection nodes comprise an adapter for receiving the preterminated and pre-connectorized optical fiber of the distribution cable.

21. The fiber optic communications network of claim 19, wherein adjacent ones of the plurality of optical connection nodes are articulated relative to one another.

22. The fiber optic communications network of claim 19, further comprising a tether having a first end attached to the distribution cable at the mid-span access location and a second end attached to the linear chain of connection nodes such that the linear chain of connection nodes are slidably attached to the distribution cable.

23. The fiber optic communications network of claim 19, wherein the distribution cable accommodates any number of optical connection nodes and preterminated optical fibers while maintaining an outer diameter that is not greater than the outer diameter of any one of the optical connection nodes.

24. The fiber optic communications network of claim 19, wherein the articulated optical connection nodes are configured such that the distribution cable has a bend radius of at least about 9 inches adjacent the mid-span access location.

* * * * *